June 25, 1963

A. DOUTY ETAL 3,095,121

CHEMICAL FEED CONTROL SYSTEM

Filed Oct. 20, 1960

INVENTORS
Alfred Douty
Dwight E. Bieszkowski
BY
Synnestvedt & Lechner
ATTORNEYS

United States Patent Office 3,095,121
Patented June 25, 1963

3,095,121
CHEMICAL FEED CONTROL SYSTEM
Alfred Douty, Wyncote, and Dwight E. Buczkowski, Ambler, Pa., assignors to Amchem Products, Inc., Ambler, Pa., a corporation of Delaware
Filed Oct. 20, 1960, Ser. No. 63,918
2 Claims. (Cl. 222—52)

This invention relates to chemical processes which involve the use of treating solutions the constituents of which must be regularly renewed as the process is continued in operation and is particularly concerned with systems which employ liquid chemicals or solutions. It is especially useful in the feeding or metering of corrosive chemicals containing limited amounts of fine, suspended, solid matter.

By way of example, the invention is especially useful in supplying the amount of concentrated chemical which may be needed to maintain the ingredient content desired in more dilute processing solutions. A case in point is found in the maintenance of the desired ingredient concentration of solutions which are used for the treatment of metal surfaces in serial production techniques. In fact, the invention has been developed for such situations and therefore will be described with this particular use in mind, although we wish it to be understood that it is not our intention to so limit the invention.

The principal object of the invention resides in the provision of improved feeding mechanism whereby concentrated replenishing chemical can be supplied to more dilute processing solutions in whatever quantities may be desired or required. The invention also involves feeding mechanism which can be entirely automatic in its operation. Further objects and advantages will become apparent in connection with the following description of the accompanying drawings, wherein FIGURE 1 is a diagrammatic showing of a chemical feed control system for continually replenishing a metal treating solution in accordance with a pre-determined pattern, and FIGURE 2 illustrates diagrammatically a similar system which, however, includes additional refinements by means of which even more precise control of the chemical feed may be secured.

Figure 1:
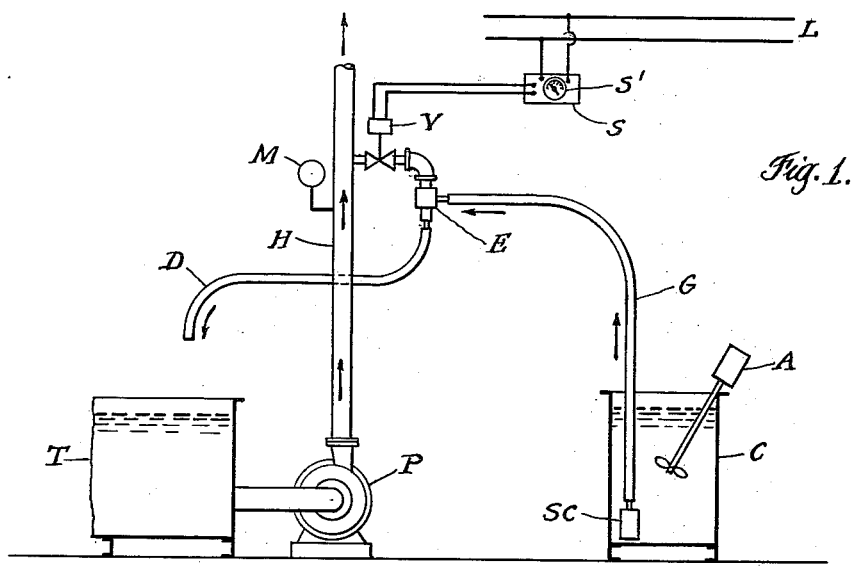
Figure 2:
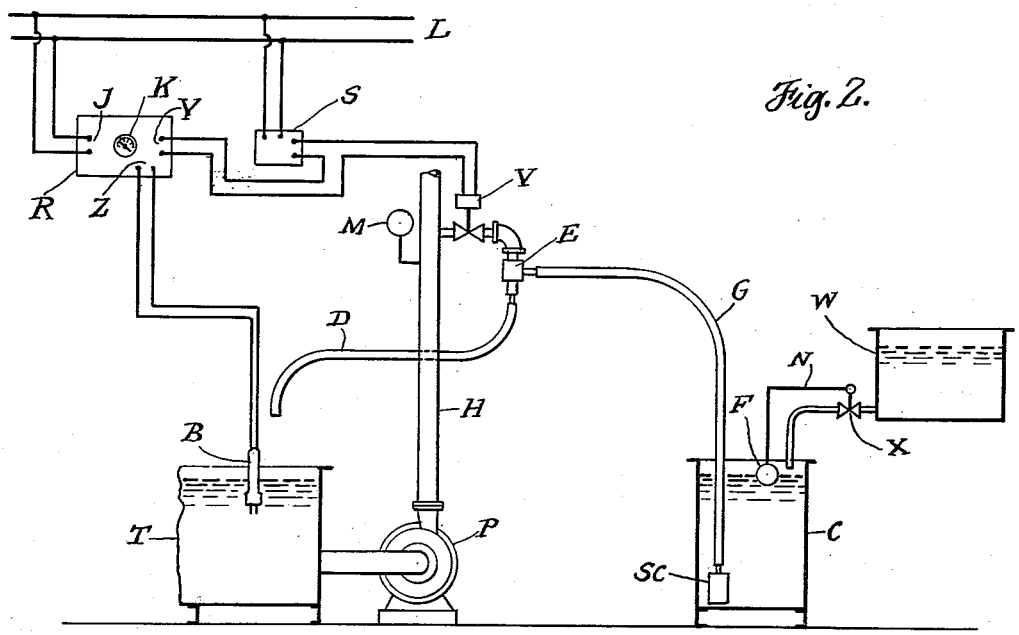

Turning first to FIGURE 1, it will be seen that we have illustrated a portion of a reservoir T which contains a relatively dilute working solution of the chemical involved in the particular process in hand—say for example a dilute metal treating solution such as might be employed in applying a chemical conversion coating to a series of metal pieces. The pieces may be immersed in the solution for the required length of time and then removed or the solution may be pumped from the reservoir and sprayed against the pieces and the run-off returned to the reservoir. Metal treating systems of this kind are well known to the art and will not be further described, but if desired reference may be had to U.S. Patent 2,813,-815, which illustrates a spray application of familiar type.

In the embodiment of FIGURE 1 a centrifugal pump P draws solution from the reservoir and delivers it to a riser or header H or other portion of a liquid circulating system in which the pressure as indicated by a gauge M is above atmospheric pressure. In a spray type metal surface-treating system the header H supplies dilute work solution from the reservoir T by way of suitable piping, to nozzles which spray the solution upon the work as the metal pieces are passed through a spray zone by suitable conveyer mechanism. As indicated the run-off from such a system is generally collected and returned to the reservoir T for re-use in the manner well understood in this art. In other metal treating systems the pieces may be suspended in the working solution reservoir in which case the pump P may be used simply to cause mixing of the solution in the reservoir by circulation.

As the process continues in operation the solution in reservoir T, of course, becomes depleted and must be replenished with the required ingredients. This is generally accomplished by adding concentrated solutions of the chemicals needed for the job in hand.

In the embodiment of FIGURE 1 concentrated chemical solution is maintained in tank C which may be provided with a mechanical stirrer driven by an electric motor A. Solid chemicals may be added to the concentrated solution in tank C and dissolved therein or the chemicals may be dissolved in water or other suitable solvent and then added to the tank. The stirrer will also function to maintain in suspension any solid undissolved matter.

Suitable piping or flexible tubing G extends from the concentrated solution in tank C up to the suction arm of an eductor or aspirator E. The lower end of the tubing G may be provided with a strainer SC to exclude solid particles too large to pass through the pipe or through the aspirator E.

The aspirator is operated by dilute processing solution taken from the reservoir T, the connection in this instance being made to the header H as shown. Under the action of the pump P this dilute solution is under pressure greater than atmospheric pressure as previously indicated. Aspirator E receives its dilute operating solution through a control valve V which will be more fully described below. When dilute liquid passes from the header H through the valve V it will cause the aspirator E to reduce the pressure in the tubing G and thus raise solution out of the tank C. This concentrated solution from the tank C is mixed with the dilute solution coming from the reservoir T and the mixture is discharged by way of the side or exit tube D which returns it to the reservoir T and thereby replenishes the solution in T with the required chemical. The discharge from the aspirator E through the tube D must be open to the atmosphere and the point of discharge must be above the level of the solutions in both reservoir T and tank C. This is important because when the valve V closes the pressure in aspirator E will rise or return to atmospheric pressure and any solution in discharge pipe D, in the aspirator E itself and in the suction line G will run back into the tank C since the solution exit from the tube D is above the solution levels in both the reservoir T and the tank C. In this way the aspirator E and its connected piping are washed free of both concentrated solution and any sediment or solid matter by virtue of the fact that dilute solution in the discharge tube D will be forced back through the aspirator E and down the tube G into the tank C. This action tends to keep the equipment clean and in good working order.

Valve V may be opened intermittently in accordance with a timing device which is set to divide a suitable interval into periods in which the valve V is either open or closed. In FIGURE 1 such a timing device is illustrated by a time-interval dividing switch S which can be set by means of a hand set indicator which is movable over a graduated dial S'. The showing in this connection is purely diagrammatic because various time-interval dividing mechanisms may be employed, our purpose being simply to close or open the circuit which controls the valve V so that the aspirator can be operated for any desired interval of time and then shut off for another interval. By way of example, if the total time interval is to be 15 minutes, the timing mechanism S' may be pre-set to be on for say as little as a few seconds or for as much as the whole 15 minutes. However, this is suggested purely by way of example for any other combination which may be needed can be employed.

We prefer to make the valve V a solenoid actuated valve which is operated by current drawn from the mains L whenever time dividing switch S is closed. Actually, any other suitable means may be employed whether electrical, pneumatic or mechanical, just so long as the device is capable of preiodically opening the valve V.

In order to emphasize the advantages of our invention we wish to call attention to certain prior practices and contrast them with what can be accomplished with our equipment. Metered feed, of course, could be accomplished by adding concentrated chemical directly to the reservoir T by means of a positive displacement chemical proportioning pump. However, there are conditions which have militated against the success of this method of feed, namely concentrated metal treating solutions are often highly corrosive. This is especially true of acid solutions used in the chromate conversion coating of metals such as solutions containing fluorides and chromates whose corrosive and erosive effect on chemical pump parts has made maintenance of such pumps very costly. In addition, if the pumps be made of corrosion resistant construction they are extremely expensive.

Another problem arises in situations where concentrated chemicals are not completely soluble in water or other solvent used in the metal treating process. To avoid overfilling the reservoir T it is desirable to use small volumes of water or solvent in preparing the concentrated solutions in tank C or to dissolve solid chemicals in tank C in dilute solution withdrawn from reservoir T for this particular purpose. However, in either case solids may remain undissolved or may actually precipitate in tank C. Such undissolved solids often rapidly foul the valves of any proportioning pump which may be used which, of course, destroys its metering function. If, instead of the intermittently wide open valve V, there is substituted an adjustable throttling valve, whether of needle, globe or gate construction, suspended particles tend soon to partially clog the valve opening and destroy its metering accuracy.

The objections referred to above are not encountered with the present invention. Because valve V and the associated piping, the aspirator, etc., are either completely open or completely colsed, rapid flow through all openings is assured with no obstructions at which "pile up" of insolubles may occur.

Insofar as the system illustrated in FIGURE 2 is concerned it will be recognized that in its essential features it is identical with that illustrated in FIGURE 1, although it has certain additional parts. In this system the interval dividing switch S acts to open and close valve V, as before, provided that conductance controlled relay R has closed the circuit from power lines L to the switch S. The conductance controlled relay R contains circuits adapted to close the internal circuit between binding posts Y whenever the conductance of the solution falls below a pre-determined value, as measured by a dipping conductance cell B which is connected to the internal control circuit by way of binding posts Z. The relay is illustrated as being adjustable so as to close at conductance values corresponding to the setting of a pointer on dial K. Power is supplied to the conductance relay R through the binding posts J.

The system of FIGURE 2 operates as follows: Whenever the conductance of the solution in reservoir T is above the value corresponding to the concentration set on the dial of R, the internal circuit between binding posts Y remains open. Thus, although switch S closes intermittently as before, valve V receives no current and does not open. Concentrated solution is introduced only when the conductance of the solution in T falls below the set point because only then does relay R close the internal circuit between binding posts Y so that successive closures of switch S can cause successive openings of valve V with resultant solution feed.

It will be understood, of course, that any automatic relay opening or closing in response to a property varying in direct relation to the strength of the solution in T may be placed in series with S to allow it to open valve V or in all successive closures of S according to whether the solution in T is below desired strength or not, as the case may be. For example, such relays can be built to respond to conductance, to optical density, to specific gravity or to some other property of the solution. Designs of this kind form no part of the present invention.

FIGURE 2 illustrates an additional feature. In order to avoid small changes in feed rate of the solution in tank C due to changes in the head within C as the solution therein is pumped out by the aspirator, an auxiliary reservoir W may be provided having a float operated valve X. A float F may be connected to X by a bell crank lever N. In this way, as long as the auxiliary reservoir W contains solution to be fed, the head in tank C remains constant which contributes to constancy of feed by the aspirator and its associated parts. Although shown in connection with control relay R, this constant level feature is actually more important in the absence of such relay because, in the latter case, the supervisory action of R is not available.

We claim:

1. A chemical feed control system comprising a reservoir containing a relatively dilute chemical treating solution, a supply tank containing a relatively concentrated solution of said chemical, an aspirator, a suction conduit connecting the aspirator with the concentrated solution in said supply tank, a conduit adapted to deliver dilute solution from the reservoir to the aspirator, a pump for placing the dilute solution which is delivered to the aspirator under pressure above atmospheric pressure, said aspirator being actuated by said dilute solution under pressure to effect said withdrawal of concentrated solution, the concentrated and the dilute solutions being mixed by the aspirator, a second conduit independent of the conduit which delivers dilute solution to the aspirator, said second conduit delivering said mixture to the dilute solution reservoir, the discharge of said mixture being open to the atmosphere at a point above the level of the solutions in the reservoir and in the tank, a valve controlling the flow of dilute solution to the aspirator, and means intermittently opening said valve as desired to effect withdrawal of concentrated solution, mixture thereof with dilute solution and delivery of the mixture to said reservoir as described, all of said parts being so constructed and arranged that, when the valve which controls the flow of dilute solution to the aspirator is closed, the solution remaining in the second conduit which delivers the mixture to the dilute solution reservoir, in the aspirator itself and in the suction conduit which connects the aspirator with the concentrated solution tank, will run back into the concentrated solution tank whereby the aspirator, the dilute solution delivery conduit and the concentrated solution suction conduit will be washed free of solution and sediment.

2. Chemical processing equipment according to claim 1 wherein a dipping conductance cell is provided in the treating solution reservoir together with a relay circuit controlled thereby which limits opening of the aspirator control valve to periods when the reservoir solution concentration is below a pre-determined standard.

References Cited in the file of this patent

UNITED STATES PATENTS

| 2,077,257 | Ofeldt | Apr. 13, 1937 |
| 2,621,795 | Armbrust | Dec. 16, 1952 |
| 2,632,144 | Borell et al. | Mar. 17, 1953 |
| 2,728,690 | Saeman | Dec. 27, 1955 |